US008738666B2

(12) United States Patent
Cowart

(10) Patent No.: US 8,738,666 B2
(45) Date of Patent: May 27, 2014

(54) SYSTEMS AND METHODS FOR ONTOLOGICAL AND META-ONTOLOGICAL DATA MODELING

(76) Inventor: Terry L. Cowart, Austin, TX (US)

( * ) Notice: Subject to any disclaimer, the term of this patent is extended or adjusted under 35 U.S.C. 154(b) by 0 days.

(21) Appl. No.: 13/590,084

(22) Filed: Aug. 20, 2012

(65) Prior Publication Data

US 2013/0290302 A1 Oct. 31, 2013

Related U.S. Application Data

(60) Provisional application No. 61/525,597, filed on Aug. 19, 2011.

(51) Int. Cl.
*G06F 7/00* (2006.01)

(52) U.S. Cl.
USPC .......................................................... 707/811

(58) Field of Classification Search
CPC .......... G06F 17/2247; G06F 17/30569; G06F 17/30; G06F 17/3089; G06F 17/2211; G06F 17/24; G06F 17/2705
USPC .................................................. 707/807, 811
See application file for complete search history.

(56) References Cited

U.S. PATENT DOCUMENTS

2011/0246530 A1* 10/2011 Malafsky ..................... 707/794

* cited by examiner

*Primary Examiner* — Truong Vo
(74) *Attorney, Agent, or Firm* — Hulsey P.C.; William N. Hulsey, III; Jacob S. Mattis

(57) ABSTRACT

According to one aspect of the disclosed subject matter, a method is provided for the association of conceptual and relational information. First, the structure information necessary to define types, relationships, attributes, and handlers is established. Then, the context in which the correlation of conceptual and relational information is to occur is established. Existing and/or new ontologies to be considered during the act of correlation are selected. Relational and conceptual information is recorded and source and/or content data is displayed.

12 Claims, 12 Drawing Sheets

Replacement Sheet

SYSTEMS AND METHODS FOR ONTOLOGICAL AND META-ONTOLOGICAL DATA MODELING

CROSS-REFERENCE TO RELATED APPLICATIONS

This application claims priority to U.S. Provisional Patent Application Ser. No. 61/525,597 filed Aug. 19, 2012, which is hereby incorporated by reference in its entirety.

FIELD

The present disclosure relates in general to the fields of ontological engineering.

BACKGROUND

A general purpose of ontological engineering is to define models of knowledge designed to improve the ability to collect and disseminate knowledge. Over years of practice, many meta-languages have been defined to assist in the development of knowledge models.

Differences between meta-languages are primarily based on their purpose and use. Meta-languages—such as DAML+OIL, OWL, and RDF—are markup schemes designed to encode knowledge in a standardized fashion. Language structure may also be used to differentiate various meta-languages. Languages whose structure is frame-based include FLogic, OKBC, and KM. Further, descriptive logic-based languages include KL-ONE, RACER, and Gellish, and languages based on first-order logic include CycL and KIF.

However, each of these meta-languages have unique benefits and drawbacks which must be analyzed prior deciding which meta-language is best to encode a particular collection of knowledge. If it is desired to re-encode the same collection of knowledge into another meta-language, a significant amount of rework is often necessary. Additionally, integration of knowledge encoded in different meta-languages may be very difficult, often requiring re-encoding of the disparate sources into a new, common representation.

SUMMARY

Therefore, a need has arisen for data modeling systems and methods which allows a user to encode and re-encode knowledge into various meta-languages is provided. In accordance with the disclosed subject matter, data modeling systems and methods for conceptual and relational correlation through the management of ontological and meta-ontological information are provided which substantially eliminates or reduces disadvantages with known methods and systems.

According to one aspect of the disclosed subject matter, a method is provided for the association of conceptual and relational information. First, the structure information necessary to define types, relationships, attributes, and handlers is established. Then, the context in which the correlation of conceptual and relational information is to occur is established. Existing and/or new ontologies to be considered during the act of correlation are selected. And relational and conceptual information is recorded and source and/or content data is displayed.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims.

BRIEF DESCRIPTION OF THE DRAWINGS

The features, nature, and advantages of the disclosed subject matter may become more apparent from the detailed description set forth below when taken in conjunction with the drawings in which like reference numerals indicate like features and wherein.

DETAILED DESCRIPTION

Figure 1:
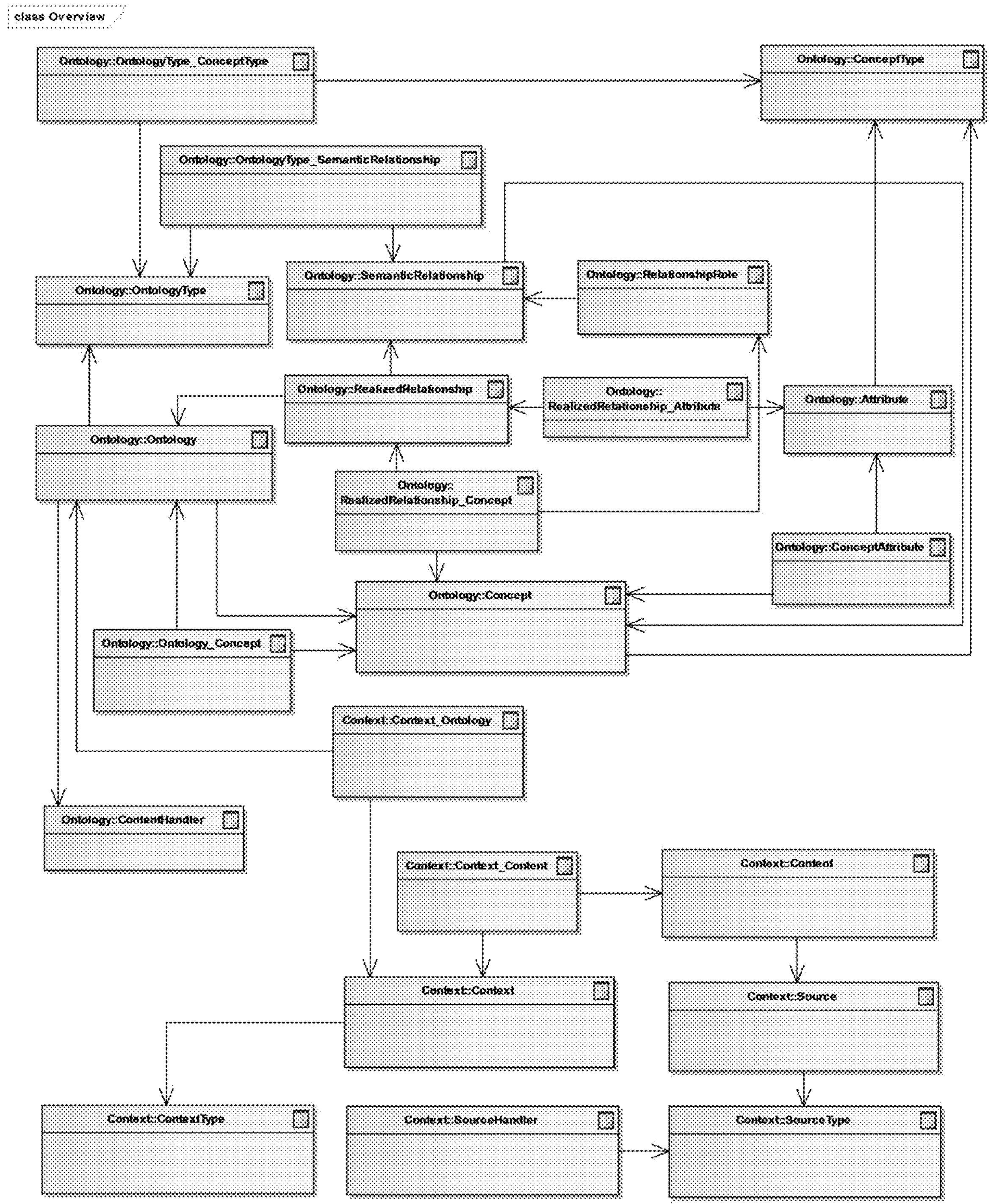
FIG. 1 is a high-level overview of an embodiment of a system data model in accordance with the disclosed subject matter.

The following description is not to be taken in a limiting sense, but is made for the purpose of describing the general principles of the present disclosure. The scope of the present disclosure should be determined with reference to the claims. Exemplary embodiments of the present disclosure are illustrated in the drawings, like numbers being used to refer to like and corresponding parts of the various drawings.

And although the present disclosure is described with reference to specific embodiments, such as a computer system, process, and computer readable medium for conceptual and relational correlation of concepts, one skilled in the art could apply the principles discussed herein to other materials, technical areas, and/or embodiments without undue experimentation. Further, while described with reference to worldwide web/internet domain ontologies, the disclosed subject matter is applicable to any data source.

To overcome the deficiencies of known schemes of knowledge representation, this disclosure provides a system, method, and medium that represents knowledge from all meta-languages in a consistent format. The method and system may utilize knowledge from the fields of cognitive science and psycholinguistics in the creation of a data model reflective of a model used by humans to represent knowledge. While able to preserve all the information of the original representation(s), the disclosed model of knowledge is specifically designed to substantially improve the ability to correlate concepts and their relationships across all knowledge encoded within it. In operation, a user may apply the methods and systems described herein to correlate, store, and manage conceptual and relational information.

The disclosed subject matter provides for a computer-implemented data modeling system and process, which may use a common processor, database, and user-interface, and/or be implemented by a tangible computer readable medium to improve the ability to correlate conceptual and relational information through the management of ontological and meta-ontological information.

The disclosed system and method may comprise the steps of and/or provide functionality for: 1) establishing the structure information necessary to define types, relationships, attributes, and handlers necessary to perform the remaining steps in the contemplated method, 2) establishing the context in which the correlation of conceptual and relational information is to occur, 3) selecting existing and/or new ontologies to be considered during the act of correlation, 4) recording of relational and conceptual information, including appropriate annotation, 5) navigation of relationships within and between selected ontologies, and 6) displaying source and/or content data.

One or more of the above methods and/or processes may be implemented on a computer. The computer may include a processor receiving instructions from a storage device including a hard drive or other type of tangible computer readable medium. The computer could also receive input from a human interface display and corresponding device such as a keyboard, mouse, tablet, etc. or from some other communications medium such as Wi-Fi, the Internet, local area network, wide area network, etc. The processor, generally in conjunction with some type of computer readable medium may run additional applications to assist implementing the methods and/or processes disclosed herein such as an operating system, database programs, document storage systems, or other applications well known in the art. The computer could further export information or data via the before mentioned communications medium, a display, etc. Furthermore, on or more of the above methods and processes could further be implemented on one or more computers, computer readable mediums, etc.

An ontology is a structured collection of realized information. The disclosed subject matter provides for the collection of the structure of information through the various metadata types which are then realized for a particular instance of the ontology. Realization is the act of associating data from a particular source to a particular ontology type (herein "OntologyType"). An example of an ontology is the Biological Classification System, (BCS), in which life is divided into a hierarchical structure which includes concept types (herein "ConceptType") such as Genus and Species. Structurally, this OntologyType is referred to as a taxonomy. The structure information might include the semantic relationship (herein "SemanticRelationship") "contains", with relationship roles (herein "RelationshipRoles") such as "parent" and "child". While this structure may be used to capture the information of the BCS, it may also be used to capture any information similarly structured. The ability to reuse the structure for multiple data sources is a key characteristic of the disclosed subject matter that provides improved correlation.

A concept is a realization of a ConceptType based on a particular information source. Using the BCS example above, the ConceptType "Species" might be realized (for humans) by the concept "Sapiens", which would have a realized relationship (herein "RealizedRelationship") "child" to the Concept "Homo" of ConceptType "Genus".

The context joins an ontology to its information source. In effect, a context establishes the connection between the structured representation of information contained in the ontology and the structured representation of information contained in the source document. Note that a single source might exist in multiple contexts, as multiple OntologyTypes might be used to transform the source information in different ways to meet different objectives.

An ontology realizes an OntologyType based upon a source. The OntologyType defines the structure of the information, and contains all the metadata types. SemanticRelationships define how ConceptTypes are connected. When an ontology is realized, a RealizedRelationship is created as part of the ontology and associated to a concept of the appropriate ConceptType. In the BCS example, the ontology would be "BCS", the RealizedRelationshp would be of type "contains", and the two concepts "Homo" of type "Genus" and "Sapiens" of type "Species" would be associated to the RealizedRelationship, with RelationshipRoles of "parent" and "child" respectively.

Figure 5:
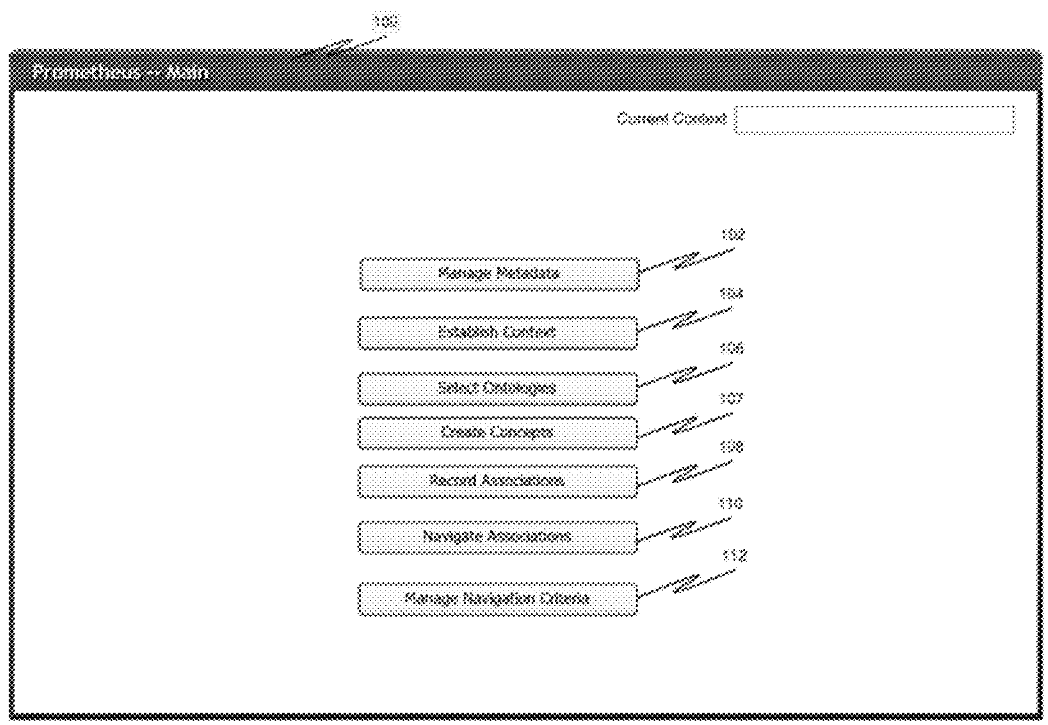
FIG. 5 is a screen shot of showing an example menu interface in accordance with the disclosed subject matter.

As used herein, the term metadata or metadata type references types of information and relationships collected—for example shown as 102 in the screen shot of FIG. 5. Managing metadata depends on the Metadata Type being entered, such as ConceptType, OntologyType, SemanticRelationship, RelationshipRole, Attribute, ContentHandler, ContextType, SourceType, and SourceHandler.

Figure 2:
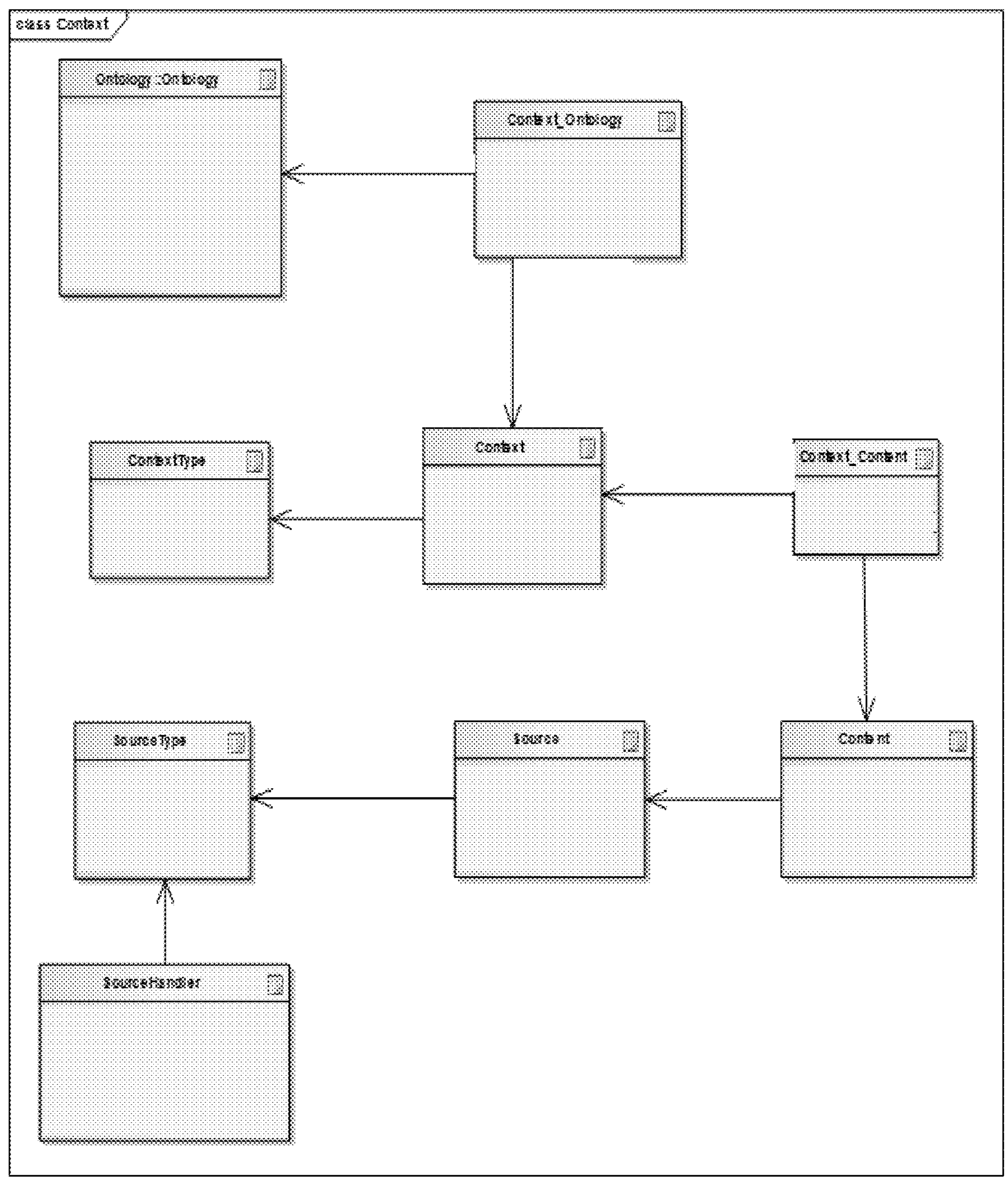
FIG. 2 is a detail data model of the context elements of an embodiment of a system data model in accordance with the disclosed subject matter.
Figure 3:
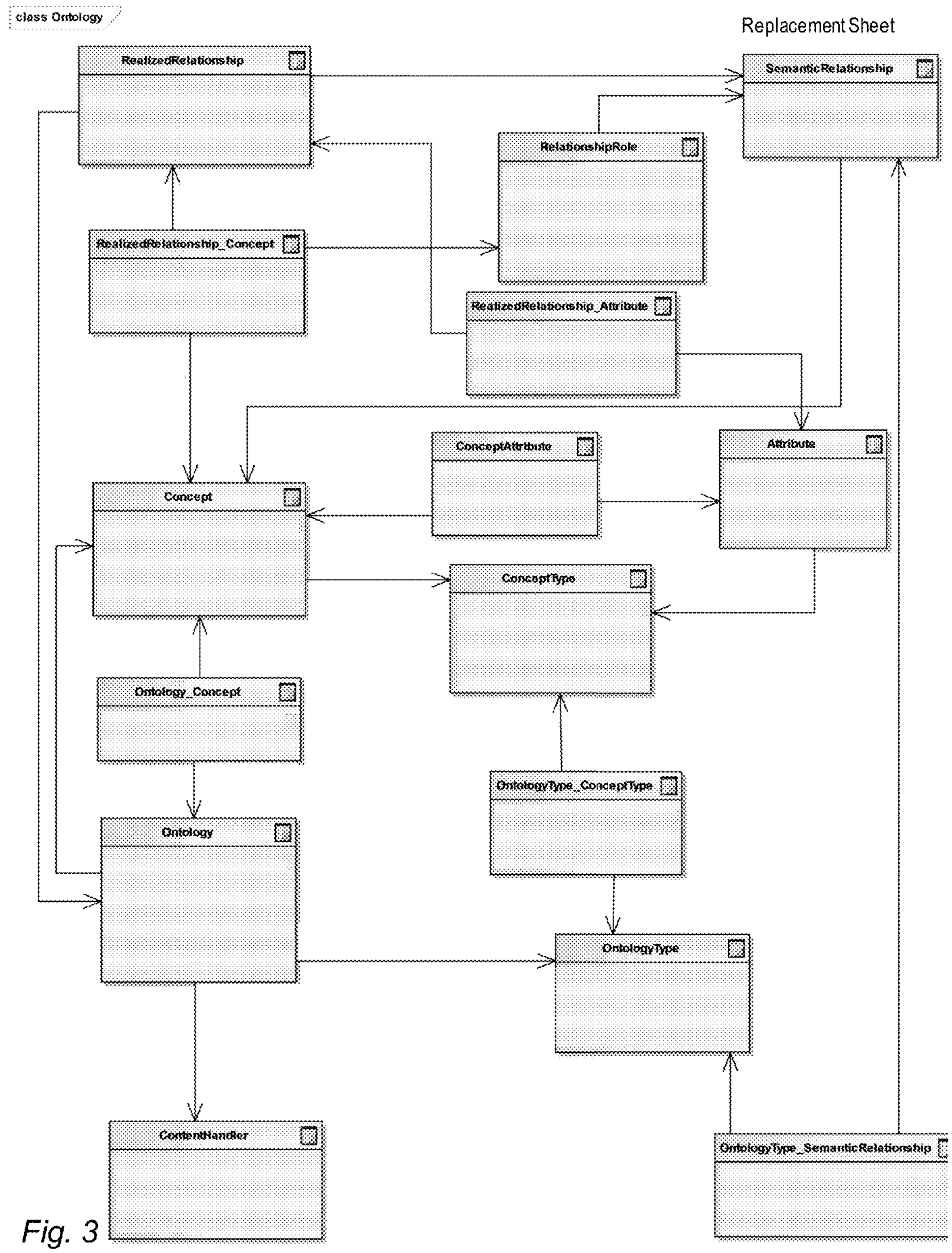
FIG. 3 is a detail data model of the ontology elements of an embodiment of a system data model in accordance with the disclosed subject matter.
Figure 4:
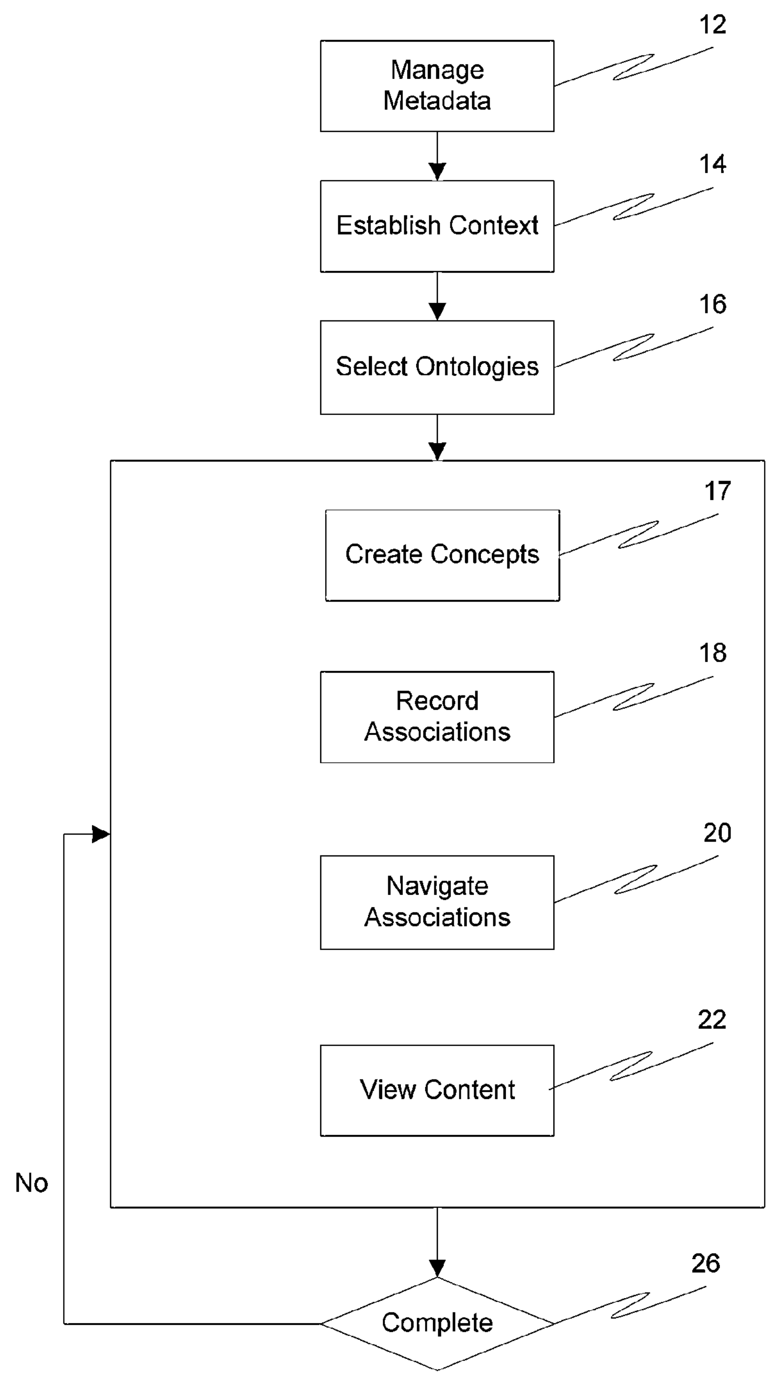
FIG. 4 is a flow chart of a method for conceptual and relational correlation in accordance with the disclosed subject matter.

FIGS. 1-3 are data model diagrams showing the relationship and flow of data in accordance with the disclosed subject matter. FIG. 4 is a high level flow diagram showing the major processing steps for correlating conceptual and relational information. FIGS. 5-12 are screen shots of a graphical user interface allowing a user to manage ontological and meta-ontoligical information.

FIG. 1 is an exemplary high-level overview of the system's data model. FIG. 2 is an exemplary detail data model of the context elements of the system's data model. FIG. 3 is an exemplary detail data model of the ontology elements of the system's data model.

Figure 6:
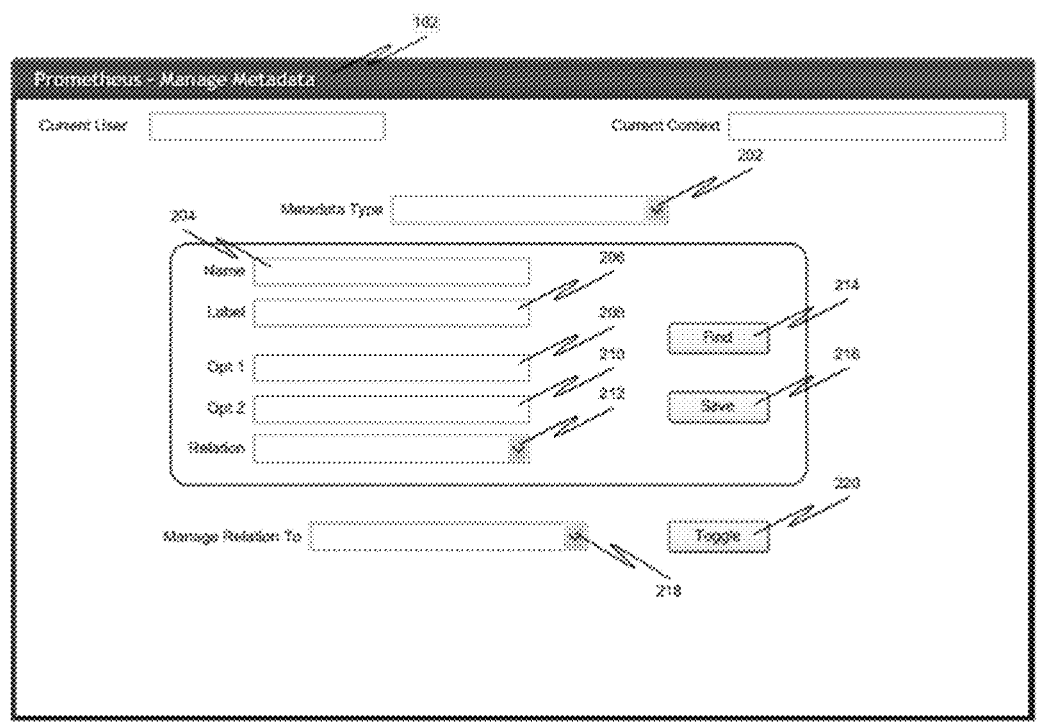
FIG. 6 is a screen shot of showing a manage metadata system function of the disclosed subject matter.

Table 1 below shows the data fields from the data models of FIGS. 1-3 and corresponding reference numerals in the screen shots of FIGS. 4-12—each data field populated during execution of their corresponding function. Note that values from FIG. 6 are omitted and are provided in the Metadata Type examples in Table 2.

TABLE 1

| Reference # | Table::Column |
|---|---|
| 402 | Context::name |
| 408 | Context::label |
| 410 | Content::name |
| 416 | Content::data |
| 418 | Source::name |
| 424 | Source:uri |
| 426 | SourceType::name |
| 432 | Context::name |
| 602 | Ontology::name |
| 608 | Ontology::label |
| 610 | OntologyType::name |
| 612 | ContentHandler::name |
| 616 | Ontology::name |

TABLE 1-continued

| Reference # | Table::Column |
|---|---|
| 618 | OntologyType::name |
| 704 | ConceptType::name |
| 708 | Concept::name |
| 710 | Concept::label |
| 712 | Concept::description |
| 714 | Attribute::name |
| 716 | ConceptAttribute::value |
| 802 | ConceptType::name |
| 804 | ConceptType::name |
| 806 | Concept::name |
| 808 | Concept::name |
| 810 | Ontology::name |
| 812 | SemanticRelationship::name |
| 816 | RelationshipRole::name |
| 818 | RelationshipRole::name |
| 820 | Attribute::name |
| 822 | RealizedRelationship__Attribute::value |
| 1002 | Ontology::name |
| 1004 | ConceptType::name |
| 1006 | Concept::name |
| 1008 | Concept::label |
| 1010 | ConceptType::name |
| 1012 | Concept::description |
| 1016 | Ontology::name |
| 1018 | OntologyType::name |
| 1020 | SemanticRelationship::name |
| 1024 | SemanticRelationship::name |
| 1026 | SUM(RealizedRelationship__Attribute::value) |
| 1028 | Concept::name |
| 1030 | Ontology::name |
| 1032 | SemanticRelationship::name |
| 1202 | Source::name |
| 1204 | Content::data |
| 1206 | SourceType::name |

It is to be understood that the disclosed subject matter is not limited in application to the details of construction and to the arrangements of the components set forth in the following descriptions or drawings. The disclosed subject matter is capable of other embodiments and of being practiced and carried out in various ways. For example, in at least one specific envisioned alternative implementation it is contemplated that the entry of information into the system, as indicated by the steps 12, 14, 17 and 18 in FIG. 4 herein, might be performed programmatically in a process which we shall refer to herein as "ingestion" in order to distinguish such a realization from the one contemplated in the detailed description below, which we refer to as "entry".

Referring now to the drawings, and more particularly to FIG. 4, a high level flow diagram is shown that provides an overview of the method according to the disclosed subject matter. In the first step, step 12, information necessary to define types, relationships, attributes, and handlers necessary to perform the remaining steps in the contemplated method is collected. However, it is envisioned that in at least some embodiments that the various types of such information (an exemplary list of which can be found in the first column of Table 2) will be selectable from data previously entered or ingested into the system, in order to maximize the correlation of system data through reuse of existing values.

In the second step, step 14, a context is established in which correlation of conceptual and relational information is to occur. A purpose of this step is to limit the amount of information a user is provided to only that information associated with a particular context.

In the third step, step 16, ontologies are selected from existing data, or new ones are established, to be considered during work related to the current context as established during the activity of the second step, step 14. This activity of creating or associating ontologies to the current context is indicated by step 16. It is important to note that the activities of steps 14 and 16 are intended to facilitate use of the system by users, and not in any other way to constrain the functionality of the disclosed system. In the fourth step, step 17, the user may create new concepts. This includes the ability to assign the values of attributes to the concept based on its type. In the fifth step, step 18, the user may create new relationships between concepts. This includes the ability to associate values, called attributes, to the relationship.

In the sixth step, step 20, the user may navigate relationships between concepts. In an alternative embodiment, this may include the ability to restrict viewable relationships. In the seventh step, step 22, content associated with a particular source is displayed to the user.

It should be noted that in at least some envisioned realizations of the disclosed subject matter, steps 17, 18, 19, and 20 are not required to be performed in any particular order. Rather, they represent steps that may be performed as required by any particular utilization of the disclosed process.

In at least one specific envisioned alternative implementation of the disclosed subject matter, steps 17, 18, 19, and 20 may be managed via the implementation of a workflow engine. The workflow engine may potentially control the order in which these steps are performed, as well as prepopulating, restricting, and otherwise controlling the information flow during these steps, dependent upon the state of the workflow engine and particularly the context.

FIG. 5 is a screen shot 100 of a system implementing the various process steps shown in the flow of FIG. 4. When first entered, only buttons 102 and 104 are enabled for a user. When a current context is established via the establish context 14 process, the buttons 106, 107, 108, 110, and 112 may be enabled for a user.

FIG. 6 is a screen shot 102 of a system implementing the manage metadata 12 process of FIG. 4. When the screen is selected via the Manage Metadata button 102 in FIG. 5, the system populates the metadata type drop-down 202 with a set of values, an exemplary collection of which is shown in the first column of data in Table 2, Metadata Type, which is reproduced below for descriptive purposes and should not be construed in a limiting sense.

TABLE 2

| Metadata Type (Table Name) | Opt 1 (block 208) | Opt 2 (Block 210) | Relation (Block 212) | Manage Relation (Block 218) |
|---|---|---|---|---|
| ConceptType | Description | DISABLED | DISABLED | OntologyType |
| OntologyType | Description | DISABLED | DISABLED | ConceptType, SemanticRelationship |
| SemanticRelationship | DISABLED | DISABLED | DISABLED | OntologyType |
| RelationshipRole | Description | Order | SemanticRelationship | DISABLED |
| Attribute | DISABLED | DISABLED | ConceptType | DISABLED |

TABLE 2-continued

| Metadata Type (Table Name) | Opt 1 (block 208) | Opt 2 (Block 210) | Relation (Block 212) | Manage Relation (Block 218) |
|---|---|---|---|---|
| ContentHandler | ManagingClass | DISABLED | DISABLED | DISABLED |
| ContextType | DISABLED | DISABLED | DISABLED | DISABLED |
| SourceType | Description | DISABLED | DISABLED | DISABLED |
| SourceHandler | ManagingClass | DISABLED | DISABLED | SourceType |

Using the drop-down menu 202, the user selects a type of metadata to manage. Based upon the type selected, the fields represented by blocks 208 and 210 are labeled as indicted by the values shown in the row in Table 2 corresponding to the metadata type selected, or disabled if the value indicated in Table 2 is "DISABLED". In addition, drop-down 212 may populated with any existing values of the type shown in the column of Table 2 that correspond to block 212, or the field is disabled if the corresponding value is shown in Table 2 to be "DISABLED".

The user may then enter information into blocks 204, 206, 208, and 210, and select a value from block 212 (entry and selection being dependent on the blocks being available, and not disabled as described above). At any point in this entry, the user may click the button labeled "Find", shown as block 214 in FIG. 6. If "Find" is selected, the system uses any information entered in blocks 204, 206, 208, and 210 to determine if there is one and only one matching record of the metadata type indicated by block 202. If there is exactly one match, the system populates all remaining unpopulated blocks 204, 206, 208, and 210 with the data from the corresponding record. The user may then update these values. In at least one of the envisioned realizations of the disclosed subject matter, the function of block 214 may be such that as long as at least one matching record of the indicated metadata type is found, a list of all matching records will be provided and the user will be able to select from the provided list which record to manage.

When the user selects the button 216 labeled "Save," the system will either update the record found and selected by the user via button 214, if this action was previously performed since the last selection of a metadata type via drop-down 202, or will create a new record of the indicated metadata type in 202 if no such selection was performed. The record thus found or created is considered the managed metadata record. In either case, the drop-down 218 may be populated with all the values of the example metadata types shown in the Metadata Type column of Table 2 corresponding to block 218, or disabled if the corresponding column of Table 2 is "DISABLED." Also, for each value placed in block 218, if that value for that metadata type has previously, in any use of the system, been associated with the metadata record either found via block 214 or saved via block 216, that entry in the drop-down is highlighted to indicate the existing relationship.

When the user selects a value from the drop-down 218, clicking button 220 will toggle whether there is a relationship between the managed metadata record and the record selected from the drop-down 218. If there was previously a relationship record, that relationship will be deleted; if there was not previously a recorded relationship, then one is created.

Figure 7:
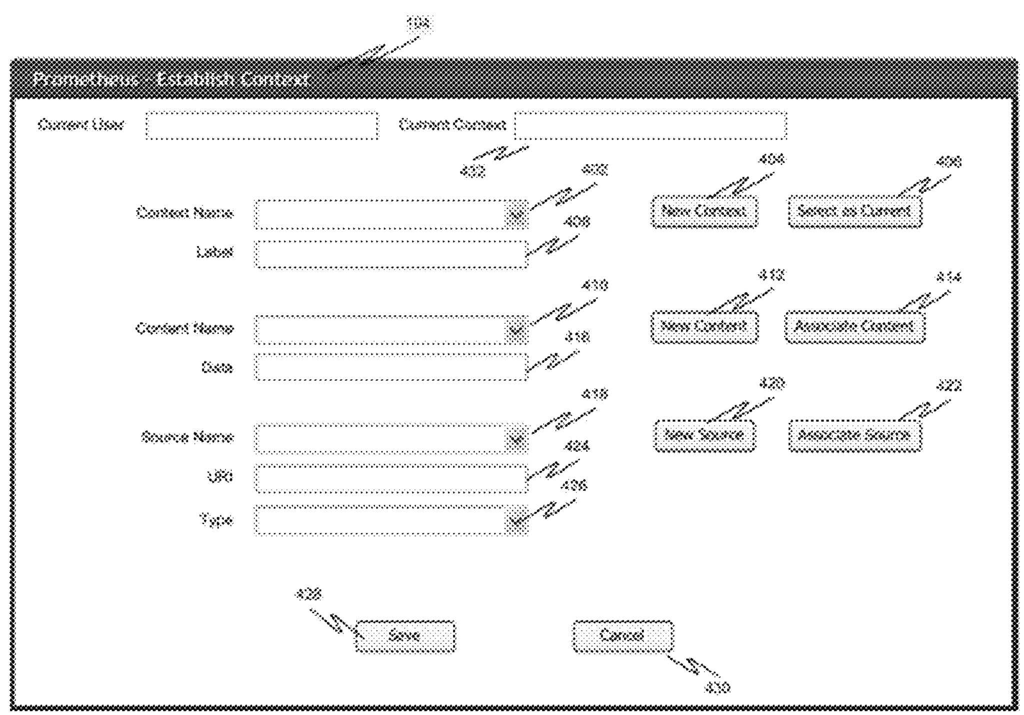
FIG. 7 is a screen shot of showing an establish context system function of the disclosed subject matter.

FIG. 7 is a screen shot 104 of a system implementing the establish context 14 process of FIG. 4. When the screen is selected via the Establish Context button 104 in FIG. 5, the system populates drop-down 402 with a list of all existing contexts within the system. All buttons are enabled with the exception of the save button 428, which is disabled. Drop down 402 has the currently selected context, if any, selected as its default. In one realization of the disclose subject matter, if there is no currently selected context the default context will be the last context used by the current user. Otherwise, the default selected context will be the first entry in the drop down. Text field 432 is populated with the name of the currently selected context.

Drop down 410 is populated with a list of all content records in the system. Those content elements which have been previously associated with the selected context may be highlighted. The first content element associated with the selected context is the selected default. If the context has no previously associated content, then the first content entry in the drop down will be the default. Text field 416 is populated with data of the selected content 410.

Drop down 418 is populated with a list of all source records stored in a database in the system. Those source elements which have been previously associated with the selected content are highlighted. The first source element associated with the selected content is the selected default. If the content has no previously associated sources, then the first source entry in the drop down will be the default. Text field 424 is populated with the uniform resource identifier (URI) of the selected source. Drop down 426 is converted to a text field, and contains the value of the source type associated with the selected sources 416.

When the user clicks the select as current button 406, the system sets the context 402 as the current context, and populates text field 432 with the label of the context 402.

When the user clicks the new context button 404, the system disables buttons 406, 412, 414, 420, and 422, un-highlights all values in the content drop down 410, and converts the drop down 402 into a text field. The user enters a context name 402, and a label 408. When text fields 402 and 408 contain values, the system enables the save button 428. If the user clicks the save button 428, the system creates a new context record with the values in 402 and 408, and restarts the establish context 14 process. If the user clicks the cancel button 430, the system discards any entered information from text fields 402 and 408, and restarts the establish context 14 process.

When the user clicks the new content button 412, the system disables buttons 404, 406, 414, 420, and 422, un-highlights all values in the source drop down 416, and converts the drop down 410 into a text field. The user enters a content name 410, and data 416. In one alternative implementation, the user will be provided the opportunity to choose to load data from an external source which will then populate the content of data 416 with the content of the user selected source. When text fields 410 and 416 contain values, the system enables the save button 428. If the user clicks the save button 428, the system creates a new content record with the values in 402 and 408, and restarts the establish context 14 process. If the user clicks the cancel button 430, the system discards any entered information from text fields 410 and 416, and restarts the establish context 14 process.

When the user clicks the new source button 420, the system disables buttons 404, 406, 412, 414, 420, and 422, converts the drop down 418 into a text field, and populates the drop down 426 with a list of all source types. The default source type selected is the first one in order. The user enters a source name 418, a URI 424, and selects a source type 426. When text fields 418 and 424 contain values, (and a value for type 426 is selected, which occurs by default), the system enables the save button 428. If the user clicks the save button 428, the system creates a new source record with the values in 418 and 424, associates the new source record to the type selected in 426, and restarts the establish context 14 process. If the user clicks the cancel button 430, the system discards any entered information from text fields 418 and 424, and restarts the establish context 14 process.

When the user clicks the associate content button 414, the association of the selected content 410 with the selected context 402 is toggled. If the context 402 and content 410 were previously associated, the association is removed, and the highlighting of content 410 is removed. If the context 402 and content 410 were not previously associated, an association is created, and the content 410 is highlighted.

When the user clicks the associate source button 422, the association of the selected source 418 with the selected content 410 is toggled. If the content 410 and source 418 were previously associated, the association is removed, and the highlighting of source 418 is removed. If the content 410 and source 418 were not previously associated, an association is created, and the source 418 is highlighted.

If the user clicks the cancel button 430 outside of the context of having clicked the new context 404, the new content button 412, or the new source button 420 button as previously described, the system will return the user to the main screen 100.

Importantly, the context may be content record in stored in a database, a webpage identified by for example a URL, or a document obtained through a document retrieval system—thus any record digitally manageable may be used as context.

Figure 8:
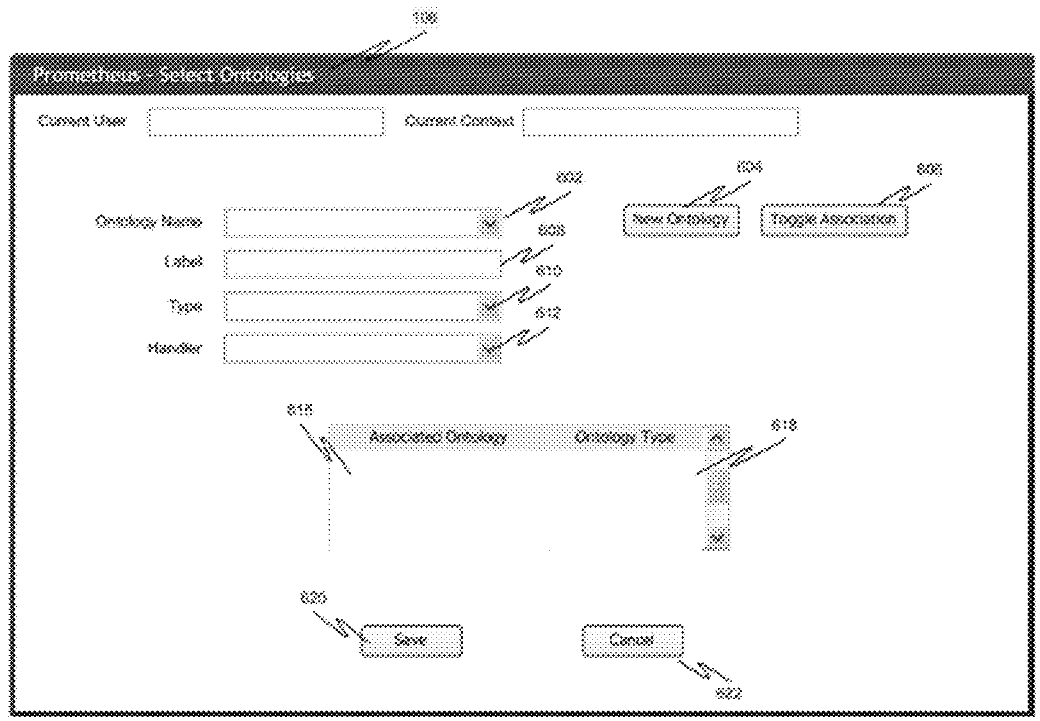
FIG. 8 is a screen shot of showing a select ontologies system function aspect of the disclosed subject matter.

FIG. 8 is a screen shot 106 of a system implementing the select ontologies 16 process shown in FIG. 5. When the screen is selected via the Select Ontologies button 106 in FIG. 5, the system populates the ontology name drop down 602 with a list of all ontologies available in the system, and disables the button 622. The default selected ontology 602 is either the first ontology associated in the current context, or the first ontology in order if no ontologies are currently selected for the current context. For the selected ontology 602, the text field 608 is populated with the label, the drop down 610 is converted to a text field and populated with the ontology type name, and the drop down 612 is converted to a text field and populated with the handler name. In addition, for each ontology associated with the current context, the list box field 616 is populated with the label of the associated ontology, and the corresponding list box field 618 is populated with associated ontology's ontology type.

When the user selects an ontology 602, the system populates the text field 608 is with the label, the drop down 610 is converted to a text field and populated with the ontology type name, and the drop down 612 is converted to a text field and populated with the handler name.

When the user clicks the toggle association button 606, the system toggles the state of association between the current context and the selected ontology 602. If the ontology was previously associated with the context, the corresponding entry is removed from the list box 616 and 618, and the association record is removed. If the ontology was not previously associated with the context, the association record is created, and an entry is added to the list box 616 and 618, containing the label and ontology type of the selected ontology 602.

When the user clicks the new ontology button 604, the system converts the drop down 602 into an editable text field, populates the drop down 610 with a list of all ontology types in the system, (making the default the first in the list), and populates the drop down 612 with a list of all handlers available in the system, (also making the default the first in the list), enables the button 622, and disables the button 620. When both the ontology name 602 and label 608 are populated, the system enables the button 620.

If the user clicks the button 620, the system creates a new ontology containing the values from text fields 602 and 608, as well as the associating the created ontology to the selected type 610 and handler 612. The system then restarts the select ontologies 106 screen, and set the default ontology to the one just created.

If the user clicks the button 622, the system disposes of any entered information, and restarts the select ontologies 106 screen.

If, outside the context of the new ontology 604 function, the user clicks the save button 620, the system returns to the main function 100.

Figure 9:
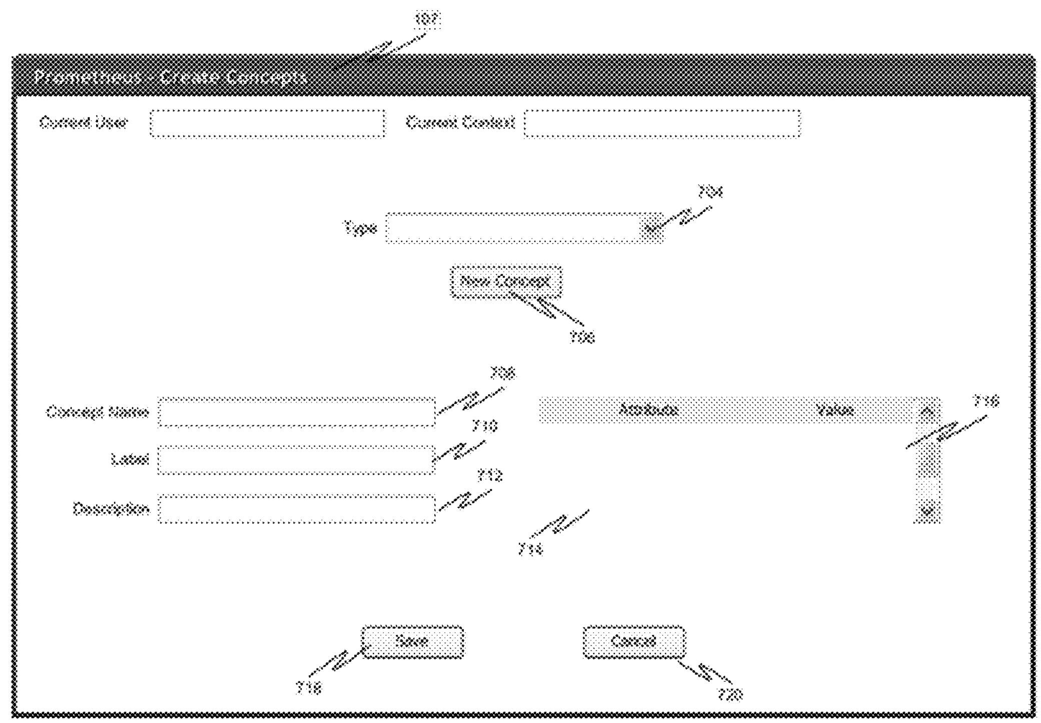
FIG. 9 is a screen shot of showing a create concepts system function aspect of the disclosed subject matter.

FIG. 9 is a screen shot 107 of a system implementing the create concepts 17 process of FIG. 5. When the screen is initiated, as for example via the Create Concepts button 107 in FIG. 5, the system populates the drop down 704 with a list of all available concept types. The default value of 704 is the first entry in order. The save button 718 is disabled, and the cancel button 720 and new concept button 706 is enabled.

The user selects a value from the drop down 704. When the user clicks the new concept button 706, the values of fields 708, 710, and 712 are cleared, the new concept button 706 is disabled, and the save button 718 is enabled. For each attribute associated with the selected concept from the drop down 704, the system places the attribute's label in a row of list box attribute column 714. The associated values 716 are blanked.

The user populates the text fields 708, 710, and 712 with the name, label and description of the new concept, respectively. The user also populates the value column of the list box 716 with the value of the associated attribute for the concept.

If the user clicks the save button 718, the system creates a new concept with the provided information, and associates it to the attributes with the values provided. The system then restarts the create concepts 17 process. If the user clicks the cancel button 720, the system discards any information entered, and restarts the create concepts 17 process.

Figure 10:
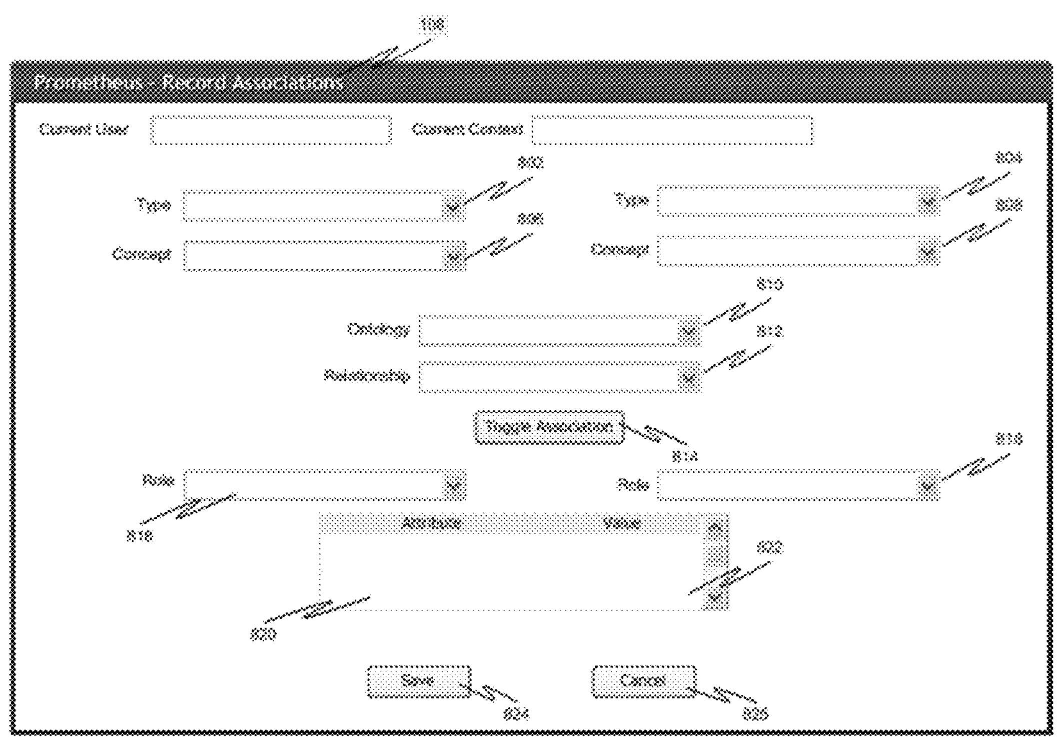
FIG. 10 is a screen shot of showing a record associations system function aspect of the disclosed subject matter.

FIG. 10 is a screen shot 108 of a system implementing the record associations 18 process of FIG. 5. When the screen is initiated, as for example via the record associations button 108 in FIG. 5, the system populates the type drop downs 802 and 804 with a list of all concept types in the system, and the drop down 810 with a list of all ontologies in the system. The buttons 814 and 824 are disabled.

When the user selects a concept type from drop downs 802 and 804, the system populates the correlating concept drop down below the selected type 806 and 808 with a list of all concepts of the type selected. The user then selects a concept from each of the drop downs 806 and 808. In one alternative implementation of the disclosed subject matter, the user may search for concepts within the selected types, using for example regular expressions, and to afterward select the concept 806 and 808 from the matching concepts.

When the user selects an ontology from drop down 810, the system populates the relationship drop down 812 with a list of all semantic relationships associated with the selected ontology. When the user selects a relationship from the drop down 812, the system populates the drop downs 816 and 818 with the relationship roles associated with the selected relationship 812.

If the selected concepts 806 and 808 are currently associated to the selected ontology and relationship 810 and 812, the system selects and highlights the associated roles of the concepts 816 and 818 for the existing relationship, and populates the rows of the list box 820 and 822 with the attributes and values of the existing relationship. If the selected concepts 806 and 808 are not currently associated to the selected ontology and relationship 810 and 812, the system selects the first role entry in drop downs 816 and 818, and populates the list box attribute column 820 with a list of all attributes associated to the selected semantic relationship 812. Regardless of whether the selected concepts 806 and 808 are currently associated to the selected ontology and relationship 810 and 812, the system also enables the toggle association button 814. In one alternative implementation of the disclosed subject matter, the user may create relationships across more than two concepts via an alternative interface. For example, the data model shown in FIG. 3 supports this capability.

When the user clicks the toggle association button 814, the system behavior depends upon whether the selected concepts 806 and 808 are currently associated to the selected ontology and relationship 810 and 812.

If the selected concepts 806 and 808 are currently associated to the selected ontology and relationship 810 and 812 when the user clicks the toggle association button 814, the system removes the association, and deletes the values of any attributes associated with the realized relationship. The system then restarts the record associations 18 process.

If the selected concepts 806 and 808 are not currently associated to the selected ontology and relationship 810 and 812 when the user clicks the toggle association button 814, the system selects the first role in the drop downs 816 and 818, populates the list box attribute column 820 with a list of all attributes associated with the selected relationship 812, and clears the associated values of the list box value column 822.

The user selects a role from drop boxes 816 and 818, identifying the role that concepts 806 and 808 play in the relationship 812. The user also enters values into the list box value column 822 for each attribute. If the selected roles 816 and 818 are different, the system enables the save button 824.

When the user clicks the save button 824, the system records the relationship 812 between the selected concepts 806 and 808, associates the associated roles 816 and 818 with their corresponding concepts 806 and 808, and the attribute and values 820 and 822. When the user clicks the cancel button 825, the system restarts the record associations 18 process, discarding any entered information.

Figure 11:
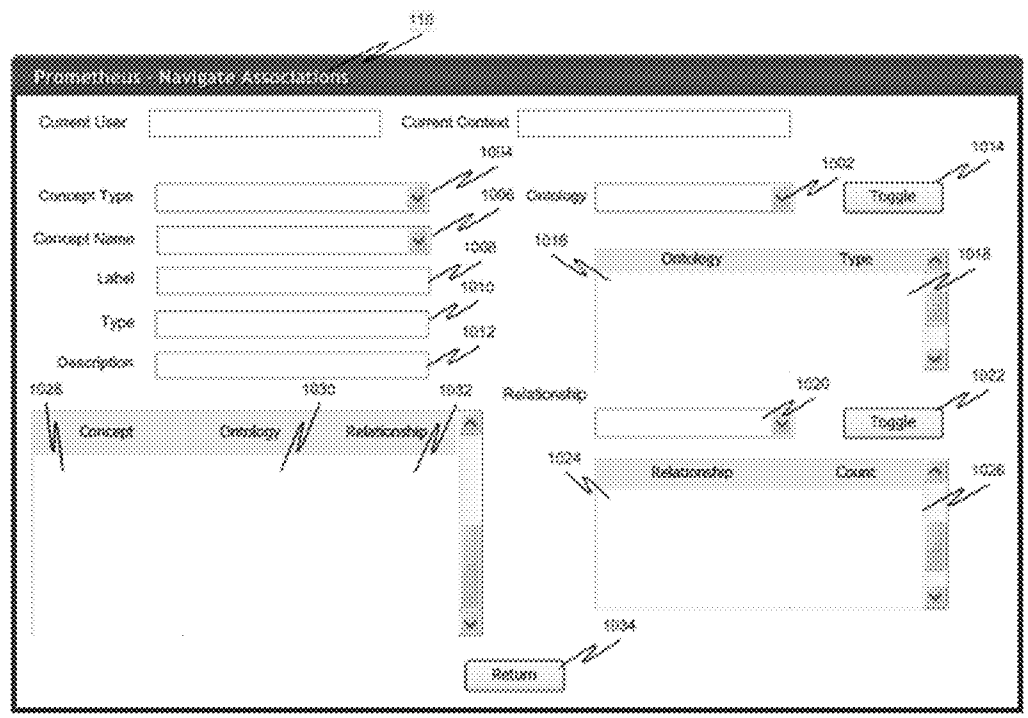
FIG. 11 is a screen shot of showing a navigation association system function aspect of the disclosed subject matter.

FIG. 11 is a screen shot 110 of a system implementing the navigate associations 20 process of FIG. 5. When the screen is initiated, the system populates the ontology drop-down 1002 with the names of all ontologies in the system. The toggle button 1014, and the return button 1034, are enabled. All other fields are unpopulated, and drop-downs and input fields are disabled.

When the user selects an entry from the ontology drop-down 1002, the system populates the concept type drop down 1004 with all the concept types associated with the selected ontology, and enables selection from the drop-down 1004.

When the user selects an entry from the concept type drop-down 1004, the system populates the concept name drop-down 1006 with the name value of all the concepts associated with the ontology 1002 and concept type 1004, and enables selection from the drop down 1006.

When the user selects an entry from the concept name drop-down 1006, the text fields 1008, 1010, and 1012 are populated with the concept label, concept type, and description of the selected concept 1006 respectively. The concept 1006, within the system, is referred to as the "reference concept", and is understood to be the concept with which all additional concepts in this process are said to have a relationship with. In one envisioned alternative implementation of the disclosed subject matter, the ability to select a specific reference concept will be performed by search methods involving the use of text fields for the entry of one or more complete or partial values for ontology, concept type, and/or concept name; and the selection from a list of matching options within the system.

When the user clicks the toggle button 1014, the system's behavior depends on whether the ontology 1002 has been previously selected during this execution of the navigate associations 20 process. If the ontology 1002 has not been previously selected, it is selected; the name of the ontology 1002 is placed in the list box column 1016, and the name of the ontology type associated with the ontology 1002 is placed in the list box column 1018. If the ontology 1002 was previously selected, then the row of the list box containing the ontology name 1016 and associated ontology type 1018 is removed from the list box, and the ontology is deselected.

When the user selects a row in the list box containing the ontology 1016 and ontology type 1018, the system populates and enables the relationship drop-down 1020 with a list of all semantic relationships associated with the selected ontology 1016.

When the user selects an entry from the relationship drop-down 1020, the toggle button 1022 is enabled. When the user clicks the toggle button 1022, the system response depends upon whether the selected relationship 1020 has been previously selected during this execution of the navigate associations 20 process. If the relationship 1020 has not been previously selected, it is selected; the name of the relationship 1020 is placed in the relationship list box column 1024; the system counts the number of times the relationship 1020 has been realized in the ontology 1016; the system places that count in the corresponding row of the count list box column 1026; and the system places the name of all concepts that are part of that relationship into the concept column of list box 1028, along with the name of the ontology 1002 into the corresponding list box column 1020, and the relationship 1020 in the corresponding list box column 1032. If the relationship 1020 was previously selected, the row of the list box containing the corresponding relationship name 1024 and count 1026 is removed, and the relationship is deselected; in addition, the rows corresponding to the relationship 1020 found in the list box column 1032 are removed.

If the user selects a concept 1028, after confirmation the system sets the concept name 1006 to the name of concept 1028, and sets the corresponding fields 1008, 1010, and 1012 to the selected concept 1028 label, type, and description respectively. All entries in list box columns 1016 and 1018 are cleared and all ontologies deselected; all entries in the list box columns 1024 and 1026 are deselected, and all relationships deselected; all columns of list box 1028, 1030, and 1032 are deleted; and all entries in the relationship drop-box 1020 are deleted, and the drop-box disabled. In effect, the selected concept 1028 becomes the "reference concept", and the system continues as previously indicated once a reference concept name 1006 is selected.

When the user clicks the return button 1034, the system returns to the main menu process 10.

Figure 12:
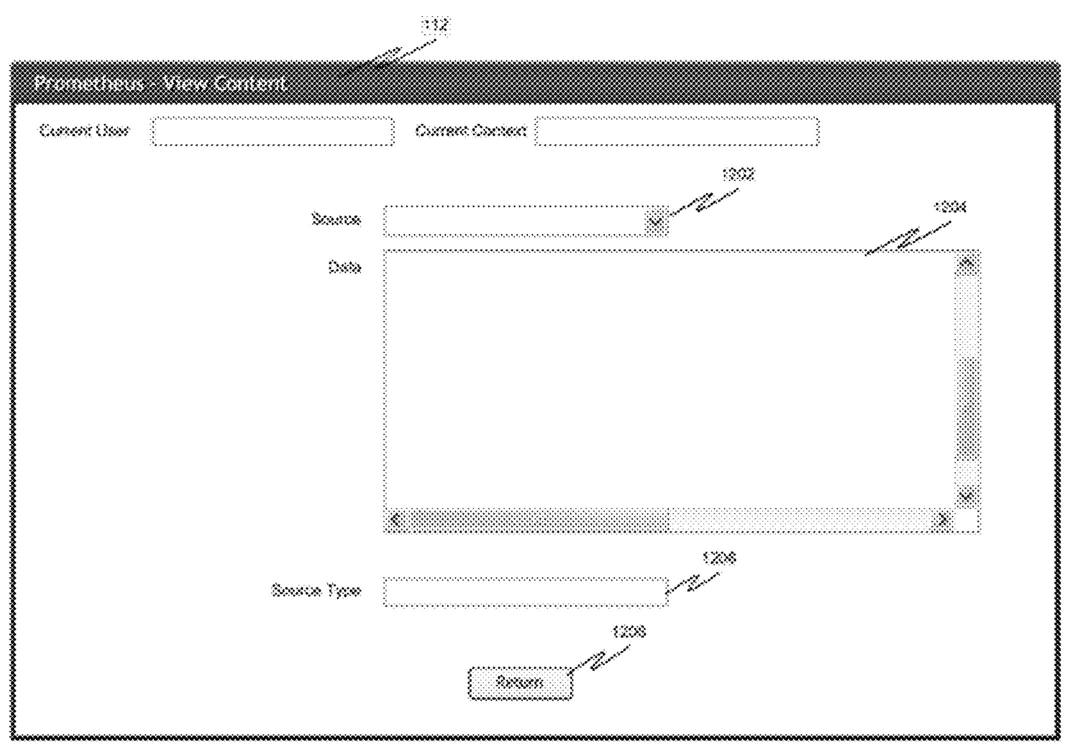
FIG. 12 is a screen shot of showing a view content system function aspect of the disclosed subject matter.

FIG. 12 is a screen shot 112 of a system implementing the navigate associations 22 process of FIG. 5. When the screen is initiated, the source drop-down 1202 is populated with a list of all sources in the system.

When the user selects an entry from the source drop-down 1202, the system populates the text box 1204 with the data from the selected source. In addition, the source type text box 1206 is populated with the source type associated with the selected source 1202. When the user clicks the return button 1208, the system returns to the main menu process 10.

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

It is intended that all such additional systems, methods, features, and advantages that are included within this description be within the scope of the claims.

What is claimed is:

1. A computer processor implemented method for the correlation of conceptual and relational information, comprising:

receiving structure information relating to metadata types from a user, by receiving a type of metadata to manage from the user, displaying at least one field corresponding to the type of metadata to the user, and receiving information from the user for entry into said at least one field;

receiving context information to establish context for the correlation of conceptual and relational information from said user, by receiving a selection of an existing item of context information or a new item of context information from the user, receiving a selection of an existing source or item of content or a new source or item of content associated with the context information from the user, and an association between at least one item of context information and at least one source or item of content from the user;

receiving ontology information for the correlation of conceptual and relational information from said user, by receiving a selection of an existing item of ontology information or a new item of ontology information from the user and an association between at least one item of ontology information and at least one item of context information;

receiving concept information for the correlation of conceptual and relational information from said user, by receiving a selection of a concept type and corresponding concept from the user, displaying a plurality of attributes associable with the concept, and receiving information from the user corresponding to the plurality of attributes;

recording relationships between conceptual and relational information, by receiving a selection of a concept from the user, receiving a selection of an ontology information from the user, displaying attributes associated with the concept to the user, displaying associations associated with the ontology information to the user, and receiving selections of concepts, ontology information, attributes, associations, or combinations thereof from the user to define said relationships; and displaying said relationships between conceptual and relational information to said user.

2. The method of claim 1, wherein the step of receiving structure information relating to metadata types from the user comprises receiving a selection of data previously entered or ingested into a non-transitory computer readable medium in communication with the computer processor.

3. The method of claim 1, wherein the step of receiving structure information relating to metadata types from the user comprises displaying a plurality of fields to the user, receiving information from the user for entry into at least one of said fields, matching the information with data entered or ingested into a non-transitory computer readable medium in communication with the computer processor, and populating at least one other of said fields using data corresponding to the information.

4. The method of claim 1, wherein the step of receiving context information to establish context for the correlation of conceptual and relational information from said user comprises receiving a selection of an existing item of context information from the user, displaying at least one corresponding source or item of content to the user, and receiving a selection of said at least one corresponding source or item of content from the user.

5. The method of claim 1, wherein the step of receiving ontology information for the correlation of conceptual and relational information from said user comprises receiving a selection of an existing item of ontology information from the user, displaying at least one pre-existing association between the existing item of ontology information and at least one item of context information, and receiving a selection of said at least one pre-existing association from the user.

6. The method of claim 1, wherein the step of displaying said relationships between conceptual and relational information to said user comprises displaying a plurality of ontology information to the user, receiving a selection of an ontology information from the user, displaying a plurality of concept types associated with the ontology information to the user, receiving a selection of a concept type from the user, displaying a plurality of concepts associated with the concept type to the user, receiving a selection of a concept from the user thereby defining a reference concept, and displaying relationships, ontology information, concepts, or combinations thereof relative to the reference concept.

7. A tangible non-transitory computer readable medium encoded with a computer-implemented program for the correlation of conceptual and relational information, the program comprising the steps of:

instructions for receiving structure information for relating to metadata types from a user, by receiving a type of metadata to manage from the user, displaying at least one field corresponding to the type of metadata to the user, and receiving information from the user for entry into said at least one field;

instructions for receiving context information to establish context for the correlation of conceptual and relational information from said use, by receiving a selection of an existing item of context information or a new item of context information from the user, receiving a selection of an existing source or item of content or a new source or item of content associated with the context information from the user, and an association between at least one item of context information and at least one source or item of content from the user;

instructions for receiving ontology information for the correlation of conceptual and relational information from said user, by receiving a selection of an existing item of ontology information or a new item of ontology information from the user and an association between at least one item of ontology information and at least one item of context information;

instructions for receiving concept information for the correlation of conceptual and relational information from said user, by receiving a selection of a concept type and corresponding concept from the user, displaying a plurality of attributes associable with the concept, an instructions for recording relationships between conceptual and relational information, by receiving a selection of a concept from the user, receiving a selection of an ontology information from the user, displaying attributes associated with the concept to the user, displaying associations associated with the ontology information to the user, and receiving selections of concepts, ontology information, attributes, associations, or combinations thereof from the user to define said relationships; and instructions for displaying said relationships between conceptual and relational information to said user.

8. The medium of claim 7, wherein the instructions for receiving structure information further perform the step of receiving a selection of data previously entered or ingested into a non-transitory computer readable medium in communication with the computer processor.

9. The medium of claim 7, wherein the instructions for receiving structure information further perform the steps of displaying a plurality of fields to the user, receiving information from the user for entry into at least one of said fields, matching the information with data entered or ingested into a non-transitory computer readable medium in communication with the computer processor, and populating at least one other of said fields using data corresponding to the information.

10. The medium of claim 7, wherein the instructions for receiving context information further perform the steps of receiving a selection of an existing item of context information from the user, displaying at least one corresponding source or item of content to the user, and receiving a selection of said at least one corresponding source or item of content from the user.

11. The medium of claim 7, wherein the instructions for receiving ontology information further perform the steps of receiving a selection of an existing item of ontology information from the user, displaying at least one pre-existing association between the existing item of ontology information and at least one item of context information, and receiving a selection of said at least one pre-existing association from the user.

12. The medium of claim 7, wherein the instructions for displaying said relationships between conceptual and relational information to said user further perform the steps of displaying a plurality of ontology information to the user, receiving a selection of an ontology information from the user, displaying a plurality of concept types associated with the ontology information to the user, receiving a selection of a concept type from the user, displaying a plurality of concepts associated with the concept type to the user, receiving a selection of a concept from the user thereby defining a reference concept, and displaying relationships, ontology information, concepts, or combinations thereof relative to the reference concept.

* * * * *